United States Patent [19]

Lieberman

[11] 4,372,981
[45] Feb. 8, 1983

[54] METHOD OF SMOKING FOOD PRODUCTS

[76] Inventor: Leon D. Lieberman, 5269-3 Newcastle St., Encino, Calif. 91316

[21] Appl. No.: 938,406

[22] Filed: Aug. 31, 1978

[51] Int. Cl.$^3$ .............................................. A23B 4/04
[52] U.S. Cl. .................................... 426/235; 426/246; 426/315; 118/621; 427/27
[58] Field of Search ............... 426/235, 236, 244, 246, 426/239, 314, 315; 99/451, 473, 474; 427/27, 30; 118/621, 624, 684

[56] References Cited

U.S. PATENT DOCUMENTS

| 1,271,300 | 7/1918 | Flanagan | 99/474 |
| 1,483,668 | 2/1924 | Little | 426/235 |
| 2,334,648 | 11/1943 | Ransburg et al. | 118/621 |
| 2,789,914 | 4/1957 | Davis, Jr. | 426/246 |
| 3,106,884 | 10/1963 | Dalve et al. | 99/451 |
| 3,236,679 | 2/1966 | Spiller et al. | 427/27 |
| 3,342,621 | 9/1967 | Point et al. | 427/27 |
| 3,896,242 | 7/1975 | Moore | 426/314 |

FOREIGN PATENT DOCUMENTS 866256 4/1961 United Kingdom ................ 426/315

Primary Examiner—Peter F. Kratz
Assistant Examiner—Michael L. Goldman
Attorney, Agent, or Firm—Saul Epstein

[57] ABSTRACT

A method of smoking meat or other food products wherein a high voltage electric field is utilized to cause particles of smoke to be drawn to the food product being smoked.

6 Claims, 3 Drawing Figures

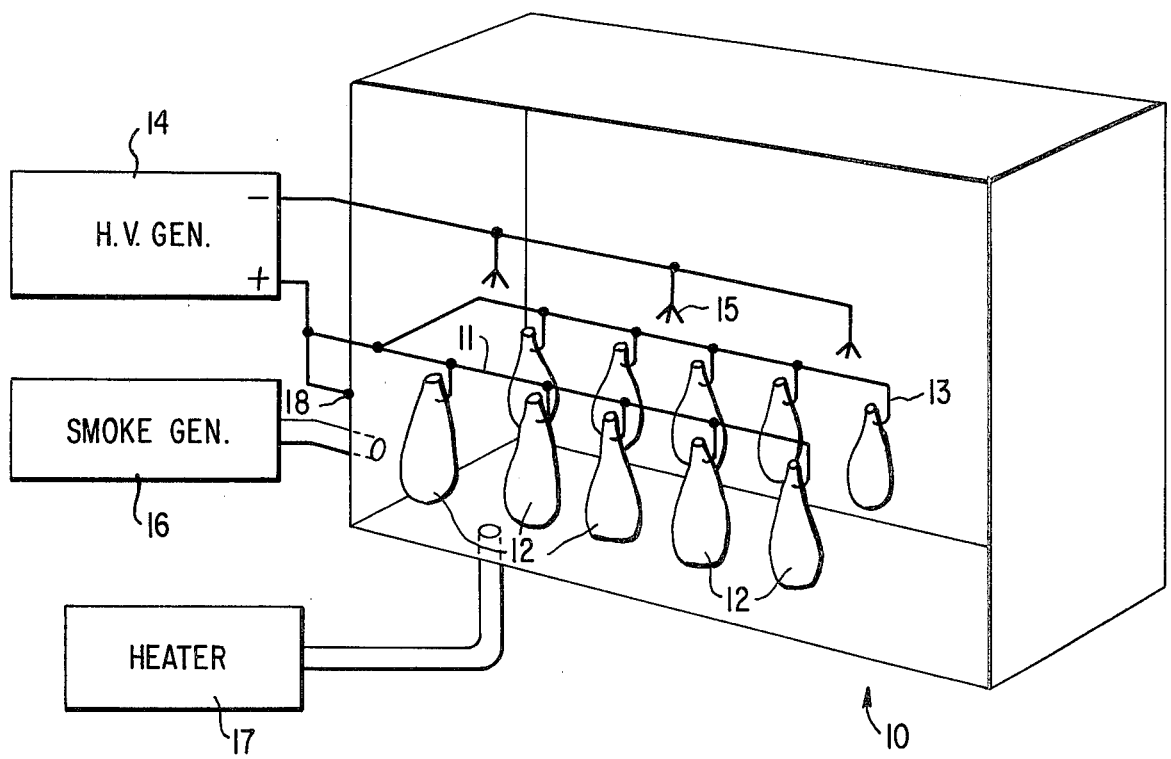
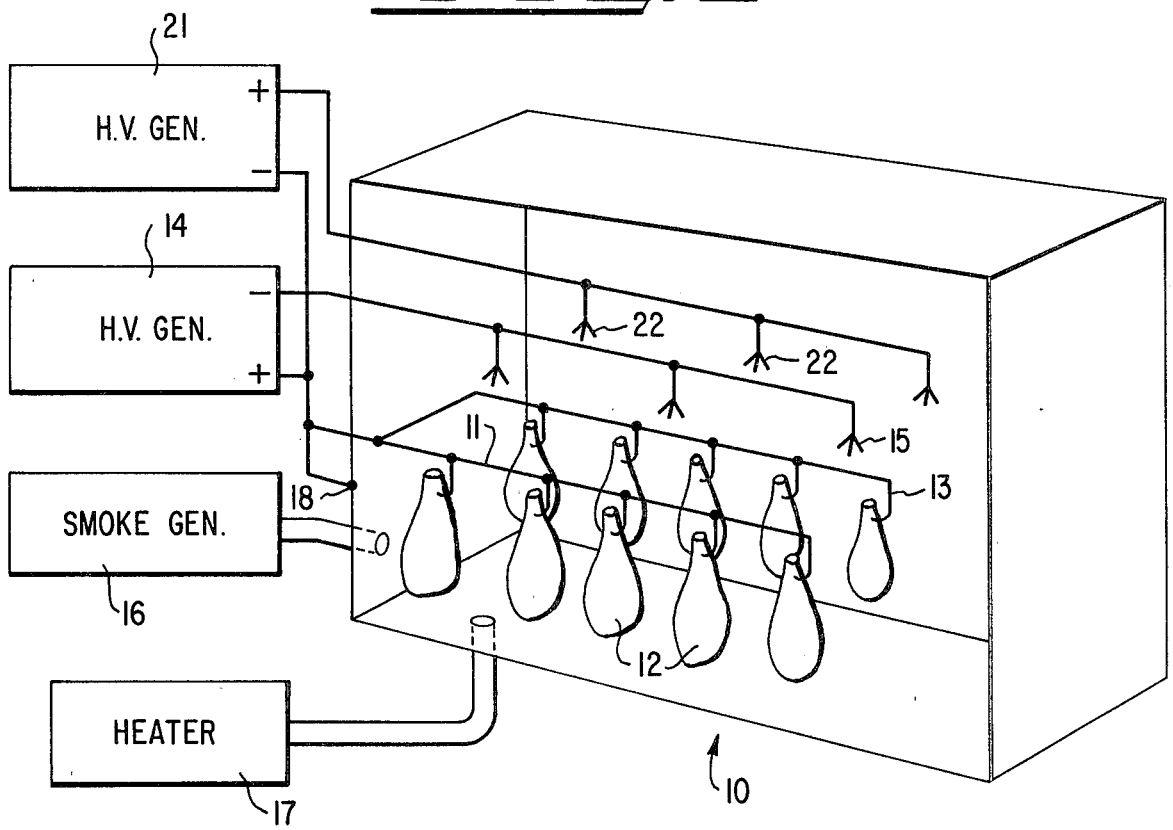

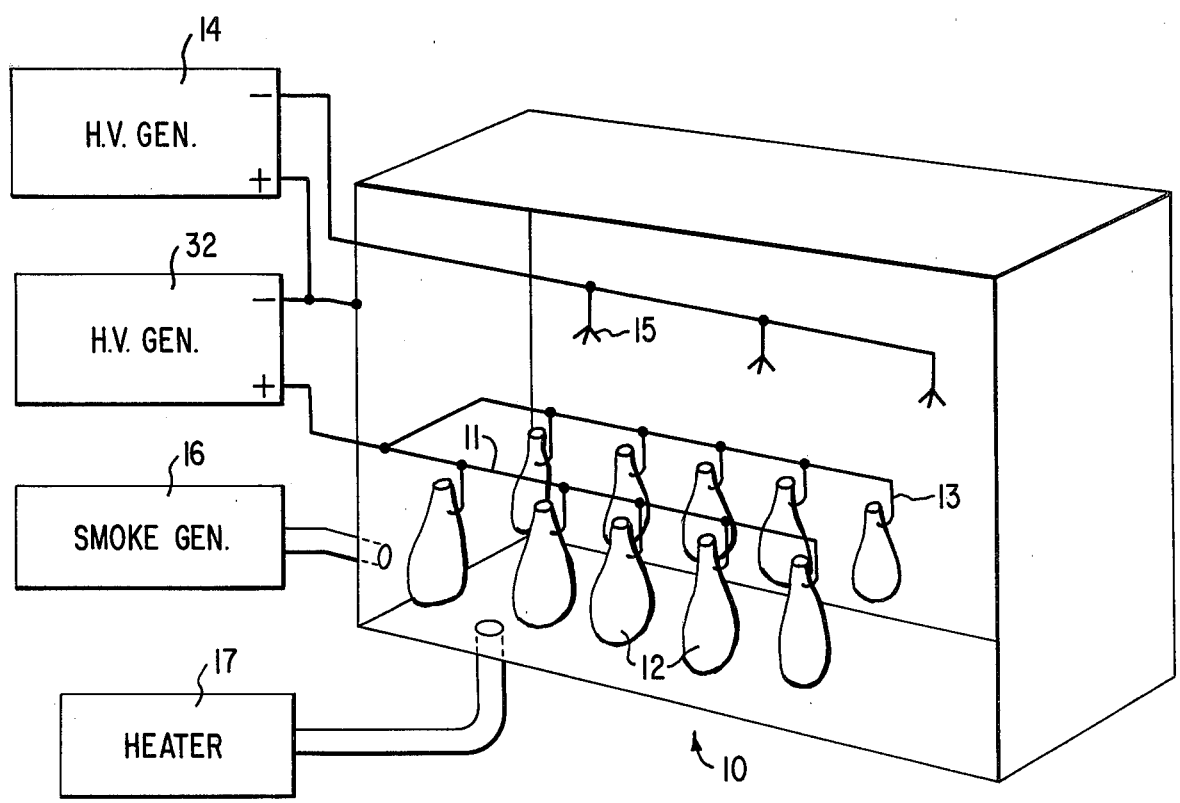

METHOD OF SMOKING FOOD PRODUCTS

BACKGROUND OF THE INVENTION

1. Field of the Invention

This invention relates to methods of smoking meat or other food products.

2. Description of the Prior Art

Smoking food products has been accomplished since ancient times by exposing the food to be smoked to an atmosphere containing a substantial amount of smoke and simultaneously heating the food. The exposure is continued until the desired density of smoke particles are deposited on the food so as to impart the desired flavor. The "smoke" may be obtained from burning wood or by atomization of a liquid known as "liquid smoke."

Since the smoke is distributed relatively evenly throughout the smoke house and there is nothing to attract the particles to the food being smoked, smoking by this method is inefficient and time consuming.

SUMMARY OF THE INVENTION

The method of smoking meat or other food products herein described utilizes electrostatic principles to enhance and increase the efficiency of meat smoking. In accordance with the principles of the invention, ions, created by a high voltage electric field are used to cause particles of smoke to be drawn to meat being smoked.

BRIEF DESCRIPTION OF THE DRAWINGS

FIG. 1 depicts the apparatus used in performing the present invention according to a first embodiment thereof.

FIG. 2 depicts the apparatus used in performing the present invention according to a second embodiment thereof.

FIG. 3 depicts the apparatus used in performing the present invention according to a third embodiment thereof.

DETAILED DESCRIPTION OF THE PREFERRED EMBODIMENTS

In the smoker, or smokehouse, 10 of FIG. 1 can be seen a hanging rack 11, from which the products to be smoked 12 are hung on hooks 13. The rack 11 and hooks 13 are electrical conductors such as stainless steel and serve as electrical connections to the products to be smoked. The rack is connected to the positive terminal of a high voltage generator 14, which is preferably located outside the smoke house. The voltage generated is not critical but voltages of the order of 18 kilovolts have been found to be satisfactory. Lower or higher voltages may be preferred in particular installations. The generation of ions through the use of high voltages has been used in other fields such as for dust precipitation, and the useful range of voltages is well documented in the literature of such applications. The negative terminal of high voltage generator 14 is connected to one or more emitters 15 suspended in the smokehouse. As will be discussed later, the positioning of the emitters is not critical, and about one emitter per 150-200 cubic feet of smokehouse volume has been found to yield satisfactory results, but even this factor is not critical. Most commercial smokehouses are fabricated from metal and in such cases it is desirable that the emitters not be too close to the metal parts, since this will reduce the effectiveness of the method. The metal walls and parts of the smokehouse are preferably connected to ground, i.e., the terminal of high voltage generator 14 which is connected to rack 11 and hooks 13. This connection is illustrated at numeral 18 in both FIGS. 1 and 2.

The emitters may simply be exposed portions of conductive material, but sharp pointed exposed ends are more efficient generators of ions than are smooth surfaces, and are therefore preferable.

Smoke generator 16 is not shown in detail as such generators are well known in the prior art. Smoke can be generated by combustion, as was known in ancient times, or by atomization of "liquid smoke" as is common in present day commercial smoking processes. Any means desired may be utilized to create the smoke. A heater 17, also well known in the prior art is used to heat the smoker to the desired smoking temperature usually between 140° F. and 180° F.

To operate the smoker in accordance with the present invention, the food products to be smoked are hung on hooks 13 and the smokehouse brought up to the desired temperature. Smoke is then introduced in the same manner as in the prior art, i.e. by atomizing "liquid smoke" or introducing smoke generated by combustion. When the food has reached smoking temperature and the smokehouse is full of smoke, the high voltage generator 14 is turned on. Due to the high voltage field then created, electrons will be emitted by emitters 15. Since oxygen easily accepts an additional electron, the free electrons emitted from emitters 15 will, upon collison with molecules of oxygen, create negative oxygen ions which are attracted toward the positive terminal of the electrical circuit, namely the food hanging on hooks 13. In the course of their travel toward the food 12, many of the negatively charged oxygen ions will collide with, and attach themselves to, particles of smoke. The particles of smoke then are attracted to the food where they form an even flavorful coating. In a relatively short time substantially all of the smoke particles in the smokehouse are attracted to the positive portion of the circuit and are deposited on the food being smoked and the other exposed positive parts, e.g. hooks 13. As will be appreciated by those skilled in the art, the order of the steps described herein, while illustrative, is not critical to the efficacious operation of the process and in any particular installation a different order might be preferable.

After several minutes, substantially all of the smoke initially in the smokehouse has been deposited, and the air contains a large excess of negative ions. Smoke entering the smokehouse under these conditions may not deposit evenly on the food being processed and the excess ions present may have to be dissipated before further smoking. In most cases, sufficient smoking is accomplished in the initial smoking step as described above, but to produce a heavier smoked product, the smoking step described above may be repeated after neutralizing the ions remaining in the air after the first smoking cycle.

The apparatus for accomplishing this is shown disgrammatically in FIG. 2 wherein a second high voltage generator 21 may be seen connected to a second group of emitters 22. The polarity of generator 21 is opposite that of generator 14, that is, the emitters are connected to the positive terminal.

In operation, the generator 14 is operated for several minutes as described above and then switched off. Generator 21 is then turned on for a short time, so as to neutralize the negative ions in the air and allow smoke to enter the smokehouse and diffuse about. When the smokehouse is again full of smoke, generator 21 is turned off and generator 14 restarted generating new negative ions, which in turn cause the particles of smoke to be driven to the product being smoked. By repeating the polarity reversal cycle a number of times, a very heavy smoking can be achieved. The polarity reversal can also be achieved using only a single high voltage generator, e.g. generator 14. In this case, the high voltage leads are simply reversed between alternate cycles.

The efficacy of the present invention can be appreciated from the results of the following examples.

EXAMPLE 1

Smokehouse Size: 10×20×9 feet
Number of Emitters: 10
Type of Load: Ham Hocks and Pork Loins
Type of Smoke: Atomized Liquid Smoke The smokehouse was loaded with the product and brought to a temperature of 150° F. Simultaneously the smokehouse was filled with smoke. After 15 minutes, the high voltage generator was turned on for a period of 15 minutes. At the end of this period the apparatus was turned off and the load removed from the smokehouse and allowed to cool. Three gallons of liquid smoke were consumed during the process. The resulting product exhibited a very even and good level of smoking. The level of smoking achieved corresponded to 60 minutes of smoking in the same smokehouse without ionization, during which time 6 gallons of liquid smoke would be consumed.

EXAMPLE 2

Smokehouse Size: 10×20×9 feet
Number of Emitters: 10
Type of Load: Turkey and Beef Wieners
Type of Smoke: Atomized Liquid Smoke The smokehouse was loaded with the product and brought to a temperature of 150° F. After the load was hot, smoke was introduced to the smokehouse and the high voltage generator was turned on. After 10 minutes the smoke and the high voltage generator were turned off and the load removed from the smokehouse. One quarter gallon of liquid smoke had been used. Smoking of this type load in this smokehouse normally consumes about 3 gallons of liquid smoke and takes approximately 30 minutes.

The emitters 14 and 22 may simply be exposed conductive parts connected to the high voltage generators. It has been found, however, that sharp points create very high local electrostatic gradients and provide a more copious supply of electrons. It is therefore preferred that the emitters be comprised of one or more needle like conductive members, each connected to the high voltage generator. As was mentioned earlier the number and location of the emitters in the smoker is not critical. Approximately 150 to 200 cubic feet of smoker per emitter has yielded very satisfactory results, the emitters being generally evenly spaced. The relationships between the generation of electrons by the emitters and the magnitude of the electric field is well known in the prior art and need not be described here. It has been found that when using emitters as described above with one emitter per 150 to 200 cubic feet of smoker volume, a voltage of 18 kilovolts has resulted in satisfactory ion production. It will be understood however that higher or lower voltages together with fewer or more emitters may be required to achieve optimum results in any particular installation.

As an example of satisfactory spacing of emitters, in the specific smokehouse referred to in the smoking examples given above, the emitters were suspended about one foot below the top of the smokehouse and spaced 2 to 3 feet apart. This spacing resulted in even smoking of the products.

FIG. 3 depicts the apparatus as used in performing the invented method in accordance with a third embodiment of the present invention. In practicing the invention according to the first and second embodiments as described above, satisfactory performance has been achieved which is a substantial improvement over the prior art. However, it has been noticed that since the metal walls and other metal parts in the smokehouse are at the same potential as the meat being smoked, some of the smoke is attracted to these parts instead of to the meat. As may be seen in FIG. 3, in the third embodiment of the invention, the meat is maintained at a positive potential with respect to the metal parts of the smokehouse, and therefore preferentially attracts the negatively charged smoke particles.

As in the first and second embodiments, a smokehouse 10 is heated by heater 17, and smoke generator 16 is used to introduce smoke particles into the smokehouse. The food products 12 being smoked are hung on hooks 13 carried on racks 11, however in this case the racks 11 are not grounded to the smokehouse 10, but instead are insulated therefrom. High voltage generator 32 maintains racks 11, and consequently food products 12 at a positive potential with respect to the smokehouse. The voltage applied by high voltage generator 32 is not critical and may be limited by the amount of insulation between racks 11 and the smokehouse. Five thousand volts has been found to be a satisfactory voltage, but more or less voltage may be found to be optimum in any particular case.

Emitters 15 are positioned as described previously, and insulated from the smokehouse. High voltage generator 14 applies a high negative voltage, e.g. eighteen thousand volts, to emitters 15, in the same manner as described in connection with the first embodiment of the invention.

To smoke the food products, the procedure is similar to that described previously. The food products to be smoked are hung on hooks 13 and the smokehouse brought up to temperature after which the smoke is introduced, as previously described. High voltage generators 14 and 32 are then turned on creating a high voltage field within the smokehouse, the potential at the food products 12 being more positive with respect to the emitters 15 than are the walls of the smokehouse 10. Thus the smoke particles, which are negatively charged due to the stream of electrons being emitted by emitters 15, as described above, are preferentially attracted to the most positive regions in the smokehouse, namely the food products 12. In this way, relatively little of the smoke is wasted by being attracted to the walls of the smokehouse. Smoking may be continued until there has been sufficient deposition of smoke particles on the products being smoked.

If a heavy smoking is desired, it may be desirable to periodically neutralize the excess of negative ions which tend to accumulate as previously described. After the smoke initially in the smokehouse has been dissipated, the polarities of both generators 14 and 32 may be reversed for a short time so as to neutralize the electric field existing in the smoke house enabling entering smoke to diffuse about.

The invention as disclosed above has been described as utilizing negative ions to cause the smoke particles to be driven to the product being smoked. While negative ions are more efficient than positive ions for this purpose, it is possible to utilize the principles of this invention using positive ions, that is, by reversing the polarity of the high voltage generator 14 so that positive ions are generated at emitters 15. When using the system as depicted in FIG. 2, the polarities of both generators 14 and 21 should be reversed, and for the embodiment of FIG. 3, the polarities of generators 14 and 32 are reversed.

I claim:

1. A method of smoking food products which comprises the steps of:
   (a) placing a food product to be smoked in an enclosed space;
   (b) electrically coupling said food product to a first terminal of a voltage source;
   (c) locating the second terminal of said voltage source within said space whereby an electric field will be created within said space;
   (d) introducing smoke into said space;
   (e) applying a first voltage between said terminals, said second terminal being negative and said first terminal being positive, and maintaining said first voltage until substantially all of said smoke has been deposited;
   (f) removing said first voltage and applying a second voltage between said terminals, said second terminal being positive and said first terminal being negative, and maintaining said second voltage for a period of time whereby the charge generated by said first voltage will be neutralized; and
   (g) reapplying said first voltage between said terminals.

2. The method recited in claim 1 wherein said second terminal is comprised of one or more sharp points.

3. The method recited in claim 2 wherein a plurality of said second terminals are located within said space.

4. The method as recited in claims 1, 2 or 3 wherein said smoke is generated by atomizing liquid smoke.

5. The method as recited in claims 1, 2 or 3 and further including the step of heating said space.

6. The method recited in claims 1, 2 or 3 wherein there are a plurality of said second terminals located within said space, there being one of said second terminals for each 150 to 200 cubic feet of said space.

* * * * *